US008972580B2

(12) United States Patent
Fleischman et al.

(10) Patent No.: US 8,972,580 B2
(45) Date of Patent: *Mar. 3, 2015

(54) DNS OUTAGE AVOIDANCE METHOD FOR RECURSIVE DNS SERVERS

(71) Applicant: Xerocole, Inc., Clifton Park, NY (US)

(72) Inventors: Robert M. Fleischman, Concord, NH (US); William Thomas Waters, Clifton Park, NY (US); Robert Alton Wyatt, Windham, NH (US)

(73) Assignee: Xerocole, Inc., Boulder, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/049,419

(22) Filed: Oct. 9, 2013

(65) Prior Publication Data
US 2014/0244725 A1 Aug. 28, 2014

Related U.S. Application Data

(63) Continuation of application No. 13/756,642, filed on Feb. 1, 2013, now Pat. No. 8,583,801.

(51) Int. Cl.
*G06F 15/16* (2006.01)
*H04L 29/12* (2006.01)
*H04L 29/08* (2006.01)
*H04L 29/14* (2006.01)

(52) U.S. Cl.
CPC ............ *H04L 61/20* (2013.01); *H04L 61/1511* (2013.01); *H04L 67/2842* (2013.01); *H04L 69/40* (2013.01); *H04L 61/6009* (2013.01)
USPC .......................................... 709/226; 709/217

(58) Field of Classification Search
CPC ............................ H04L 61/1511; H04L 61/20

USPC .................................................. 709/226, 217
See application file for complete search history.

(56) References Cited

U.S. PATENT DOCUMENTS

| 8,583,801 | B2 * | 11/2013 | Fleischman et al. ........... 709/226 |
| 2003/0154306 | A1 | 8/2003 | Perry |
| 2007/0041393 | A1 | 2/2007 | Westhead et al. |
| 2007/0118668 | A1 | 5/2007 | McCarthy et al. |
| 2007/0294427 | A1 | 12/2007 | Retkin et al. |
| 2008/0028463 | A1 | 1/2008 | Dagon et al. |
| 2008/0086574 | A1 | 4/2008 | Raciborski et al. |
| 2008/0288470 | A1 | 11/2008 | Goutard et al. |

(Continued)

FOREIGN PATENT DOCUMENTS

WO 2012065641 A1 5/2012

OTHER PUBLICATIONS

Zong, Ruolei, "Office Action re U.S. Appl. No. 13/759,191", Jun. 4, 2013, p. 65 Published in: US.

(Continued)

*Primary Examiner* — Larry Donaghue
(74) *Attorney, Agent, or Firm* — Neugeboren O'Dowd PC

(57) ABSTRACT

This disclosure describes systems, methods, and apparatus to protect users of the Internet from DNS outages. In particular, an outage avoidance system is provided that includes query processing, outage avoidance processing, and a local cache, all configured to extend the TTL of expired answers to DNS queries or to ignore the expiration of an answer's TTL value, and thereby provide the expired answer in response to a client request when a DNS server is unable to obtain an answer from a remote DNS server.

8 Claims, 8 Drawing Sheets

(56) References Cited

U.S. PATENT DOCUMENTS

| | | |
|---|---|---|
| 2010/0199122 A1 | 8/2010 | Sood |
| 2010/0257258 A1 | 10/2010 | Liu et al. |
| 2010/0274970 A1 | 10/2010 | Treuhaft et al. |
| 2010/0332680 A1 | 12/2010 | Anderson et al. |
| 2011/0087769 A1 | 4/2011 | Holmes et al. |
| 2011/0208876 A1 | 8/2011 | Marshall et al. |
| 2011/0302322 A1 | 12/2011 | Raciborski et al. |
| 2012/0036161 A1 | 2/2012 | Lacapra et al. |
| 2012/0215912 A1 | 8/2012 | Holden et al. |
| 2012/0254996 A1 | 10/2012 | Wilbourn et al. |
| 2012/0324113 A1 | 12/2012 | Prince et al. |
| 2013/0086263 A1 | 4/2013 | Prasad et al. |

OTHER PUBLICATIONS

Gruber, Stephen S., "Response to Office Action re U.S. Appl. No. 13/759,191", Jun. 24, 2013, p. 11 Published in: US.

Young, Lee W., "International Search Report and Written Opinion re Application No. PCT/US13/24163", May 20, 2013, p. 9 Published in: WO.

Young, Lee W., "International Search Report and Written Opinion re Application No. PCT/US2013/24693", May 23, 2013, p. 9 Published in: US.

Qian, et al., "Bringing Local DNS Servers Close to Their Clients", 2011, p. 6 Published in: US.

Donaghue, Larry D., "Office Action re U.S. Appl. No. 13/756,642", Jun. 4, 2013, p. 19 Published in: US, Jul. 2, 2014.

Gruber, Stephen S., "Response to Office Action re U.S. Appl. No. 13/756,642", Jun. 17, 2013, p. 9 Published in: US.

Baharlou, Simin, "International Preliminary Report on Patentability re Application No. PCT/US2013/024163", Aug. 5, 2014, p. 6 Published in: CH.

* cited by examiner

DNS OUTAGE AVOIDANCE METHOD FOR RECURSIVE DNS SERVERS

PRIORITY AND RELATED APPLICATIONS

The present application for patent claims priority to, and is a continuation of, U.S. patent application Ser. No. 13/756,642 entitled "DNS OUTAGE AVOIDANCE METHOD FOR RECURSIVE DNS SERVERS" filed Feb. 1, 2013, and further claims priority to Provisional Application No. 61/593,663 entitled "DNS OUTAGE AVOIDANCE METHOD FOR RECURSIVE DNS SERVERS" filed Feb. 1, 2012. Both of these applications are assigned to the assignee hereof and are both hereby expressly incorporated by reference herein.

FIELD OF THE DISCLOSURE

The present disclosure relates generally to domain name system (DNS) activities. In particular, but not by way of limitation, the present disclosure relates to systems, methods and apparatuses for answering DNS queries.

BACKGROUND

To connect an Internet user's computer to a server hosting a webpage, a web server, an Internet Protocol (IP) address of the web server is typically required. Yet, users and web browsers typically only have access to a domain name such as "abc.example.com". To access the webpage, a web browser submits a domain name system (DNS) query to the DNS. A DNS query typically includes a domain name and the DNS either returns an IP address of the server hosting the URL or an error.

The DNS includes authoritative DNS servers that are servers responsible for translating domain names into IP addresses. Authoritative DNS servers can also be arranged in hierarchies where each level of authoritative DNS server is responsible for a level of the domain. For a given level, there are also master and slave authoritative servers and clusters of authoritative DNS servers that each maintain synched records of domain names and IP addresses. By distributing DNS records over multiple servers, loads on an authoritative DNS server can be reduced.

Yet, DNS queries would still place insurmountable loads on authoritative DNS servers, so caching on alternative servers is used to reduce the number of queries that reach authoritative DNS servers. These alternative servers are called recursive DNS servers, name servers, DNS cache servers, caching name servers, or DNS caches (hereinafter "DNS cache servers"). DNS cache servers store domain names and mappings to the associated IP addresses for some of the more commonly-requested web pages. DNS queries are directed to DNS cache servers in the hope that a DNS cache server will be able to answer the query based on an IP address in its local cache. Only where an answer has not been cached in the DNS cache server handling a query is the DNS query forwarded to one or more authoritative DNS servers.

Whether the DNS answer (e.g., an IP address of the requested web page) is obtained from a DNS cache server or from an authoritative DNS server, the DNS answer is then returned to the client that made the DNS query allowing the client to connect to the web server hosting the desired web page.

A DNS answer can include one or more data records each with a time-to-live (TTL) value that indicates how long the data is valid (not-expired). For instance, where an authoritative DNS server wants to ensure that an IP address for a web server is updated frequently, the authoritative DNS server may set a lower TTL value. A DNS answer can be cached and used to answer subsequent DNS queries as long as the TTL has yet to expire. In other words, while the TTL is ticking down, the recursive DNS need not query the remote DNS server to answer the same DNS query. However, when a DNS answer's TTL expires, the recursive DNS server typically makes queries to authoritative DNS servers to obtain a fresh copy of the data to use in DNS answers.

Sometimes the recursive DNS server is temporarily unable to update a previously valid, but, expired DNS answer in its cache. This frequently occurs when network connectivity is interrupted, so the authoritative DNS server cannot be reached, the authoritative DNS server returns an empty answer, or the authoritative DNS server returns an error. If a client requests an answer during this period, then the recursive DNS server will present the client with an error or empty message. Traditionally, such responses were not major problems and a user could merely press a reset browser button or wait a short time for the domain to come back online.

However, changes to the Internet mean that such delays, even if momentary (e.g., 30 seconds), are less tolerable today. These changes include higher volumes, more stringent consumer expectations, and more frequently updated content (e.g., streaming content, dynamic advertising, and VOIP).

This problem is enhanced by the fact that Request for Comments (RFC) standards prevent the recursive DNS server from following up a failed query for a specified period of time (e.g., 5 minutes). If an authoritative DNS server is unresponsive for a minute, but the recursive DNS server cannot recheck for updated data for five minutes after a first unsuccessful query, then there are 4 minutes of unnecessary disconnect between the client and the desired website.

SUMMARY OF THE DISCLOSURE

Exemplary embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

Some embodiments of the disclosure may be characterized as a domain name system (DNS) server system including at least a local cache storing cached DNS answers from previous DNS queries, each of the cached DNS answers having a time-to-live (TTL) value, cached DNS answers having an expired TTL value are expired DNS answers. The DNS server system may also include an outage avoidance system having a query processing module that is configured to receive a DNS query from a client; checks the local cache for a non-expired DNS answer to the DNS query; and upon not finding one, is configured to pass the DNS query to a remote DNS server system. The query processing module may also be configured to receive an empty answer, an error message, or no response from the remote DNS server system. The outage avoidance system may also include an outage avoidance processing module that is configured to, upon indication that the query processing module received an empty answer, an error message, or no response: check the local cache for an expired answer to the DNS query; and return the expired answer to the client.

Other embodiments of the disclosure may also be characterized as a proxy DNS server system. The proxy DNS server system can include a local cache storing cached DNS answers from previous queries, each of the cached DNS answers having a TTL value, cached DNS answers having an expired TTL value are considered expired answers. The proxy DNS server system can also include an outage avoidance system. The outage avoidance system can include a query processing module that is configured to receive a DNS query from a client, checks the local cache for a non-expired answer to the DNS query; and upon not finding one, is configured to pass the DNS query to a remote DNS server system via a DNS server system. The outage avoidance system can further include an outage avoidance processing module that is configured to, upon indication that the DNS server system received an empty answer, an error message, or no response from the remote DNS server system, check the local cache for an expired answer to the DNS query, and return the expired answer to the client.

Other embodiments of the disclosure can be characterized as a method of handling a DNS query from a client when an answer is not available on a local cache of a DNS server handling the DNS query and a remote server further handling the DNS query provides an empty answer, an error, or no answer. The method comprises receiving a DNS query from a client and forwarding the DNS query to a remote DNS server system. The method then receives an empty answer, an error, or no answer from the remote DNS server system. The method then checks a first local cache of a DNS server system for a first expired answer to the DNS query, or checking a second local cache of a proxy DNS server system for a second expired answer to the DNS query if the DNS server system does not have an outage avoidance system. The method also returns the first or second expired answer to the client in response to the DNS query.

Yet further embodiments of the disclosure can be characterized as an outage avoidance processing module of a server system. The module can be configured to (1) receive an error message from a query processing module of the server system; (2) check a local cache of the server system for an expired answer to a DNS query that lead to return of the error message; and (3) return the expired answer to a client that generated the DNS query.

BRIEF DESCRIPTION OF THE DRAWINGS

Various objects and advantages and a more complete understanding of the present invention are apparent and more readily appreciated by referring to the following detailed description and to the appended claims when taken in conjunction with the accompanying drawings:

DETAILED DESCRIPTION

The word "exemplary" is used herein to mean "serving as an example, instance, or illustration." Any embodiment described herein as "exemplary" is not necessarily to be construed as preferred or advantageous over other embodiments.

The present disclosure greatly reduces this interrupt period by enabling the DNS server (e.g., a recursive DNS server, a caching DNS server) to construct a valid (not-expired) answer to send to the client despite the expiration of the TTL and a concurrent inability to communicate with one or more remote DNS server systems (e.g., authoritative DNS server systems, proxies to authoritative DNS server systems, a server system running DNS script, etc.). This is particularly valuable for high value DNS requests (e.g., FACEBOOK, GOOGLE), support websites, high traffic websites, and rapidly updating websites (e.g., VOIP).

The present disclosure involves systems, methods, and apparatus for providing DNS answers to clients during momentary outages of the DNS. The invention is useful for avoiding outages and failures when a DNS server (e.g., a recursive DNS server) is temporarily unable to answer a client's query. In particular, by modifying a TTL value or ignoring the TTL value, expired answers can be provided to clients instead of an error when a TTL has expired and the DNS server cannot retrieve an answer. While there is the possibility that the client's use of the expired IP address will direct the client to an old website or result in an error, in many cases the expired answer is still usable and will allow the client to reach the desired website rather than receive an error message from the DNS server.

Figure 1:
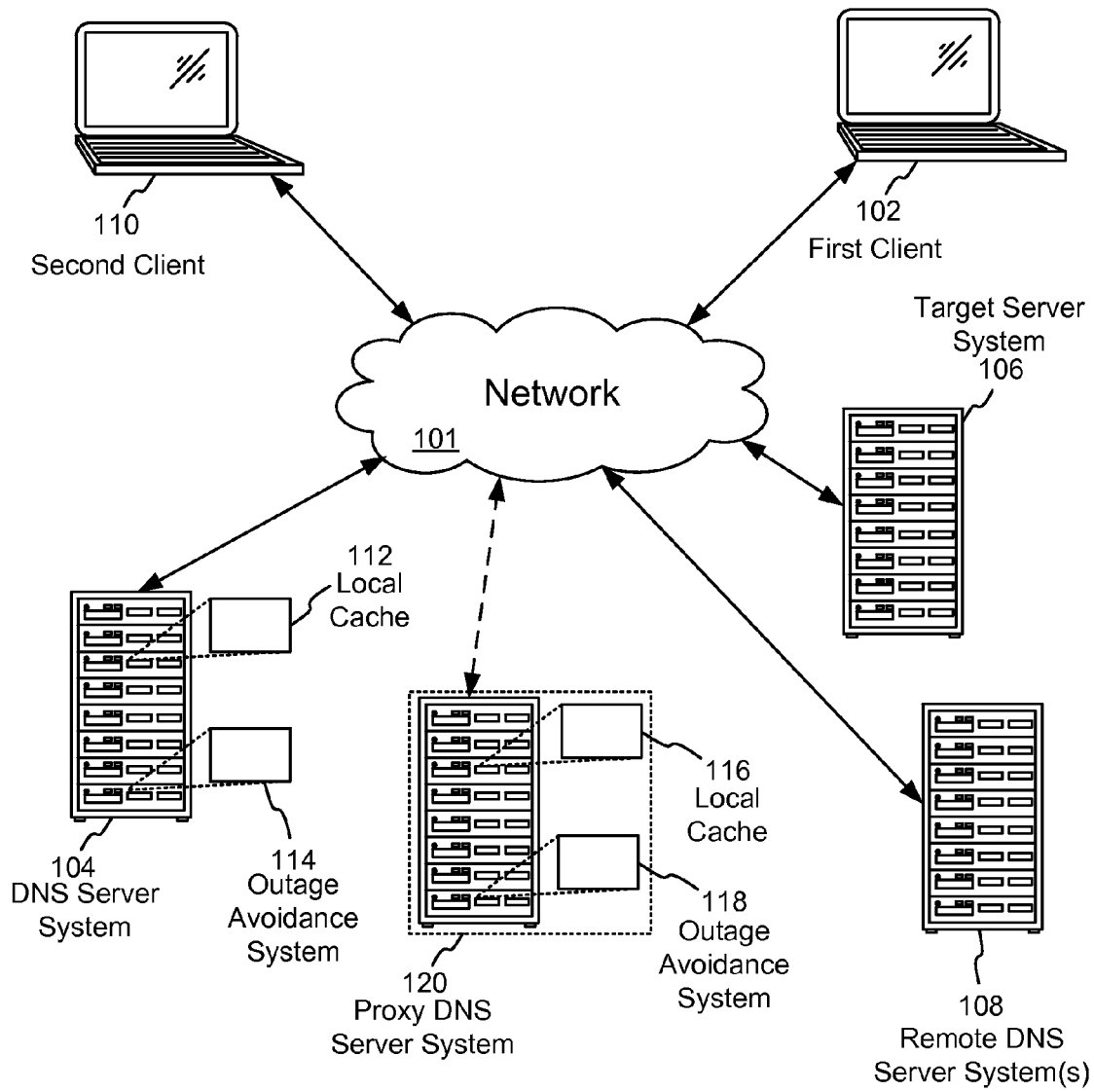
FIG. 1 illustrates an exemplary system configured to service client Internet activity.

FIG. 1 illustrates an exemplary system configured to service client Internet activity. The system 100 includes a network 101 (e.g., the Internet or a network including the Internet) that enables communication between a first client 102 and at least one DNS server system 104 as well as a target server system 106 (e.g., a host). The target server system 106 is the server system that the first client 102 wishes to connect to, but is unable to until a DNS answer to its DNS query is received. The network 101 also enables communication between the at least one DNS server system 104 and one or more remote DNS server systems 108 (e.g., an authoritative DNS server system and one or more servers responsible for being authoritative of sub-domains for the authoritative DNS server system).

The first client 102 can make a query to the DNS server system 104 for data that will enable the first client 102 to communicate with the target server system 106. For instance, such a query can request an IP address of a domain name or host name for a webpage that a user of the first client 102 wishes to access and where the target server system 106 hosts the webpage. The DNS server system 104 can receive this query from the first client 102, find an answer, and return the answer to the first client 102. The DNS server system 104 may have this answer by virtue of it being an authoritative DNS server (one that is authoritative of the target server system 106) or because the answer is stored in a local cache 112 of the DNS server system 104. If the DNS server system 104 does not have an answer, then it can seek one from a server that is likely to have the answer—the one or more remote DNS server systems 108 exemplify such a server system (e.g., an authoritative DNS server system). The one or more remote DNS server systems 108 can return the answer to the DNS server system 104, which in turn returns the answer to the first client 102. The first client 102 then uses the answer to communicate with the target server system 106.

For some time after this initial DNS query, the DNS server system 104 can provide this same answer to similar client requests, thus avoiding having to again query the one or more remote DNS server systems 108. However, this time is limited by a TTL value, which, once expired, indicates that the answer is no longer valid or reliable. In the art, when a second client 110 requests the same domain name or hostname and a TTL value associated with the answer on the DNS server system 104 has expired, the DNS server system 104 attempts to query the one or more remote DNS server systems 108 for a new or updated answer rather than providing the now expired answer to the second client 110. Sometimes the one or more remote DNS server systems 108 cannot be reached or cannot return an answer, and so the DNS server system 104 returns an error to the second client 110.

What is more, after such a failed query to the one or more remote DNS server systems 108, Federal regulations require that the DNS server system 104 wait some period of time before querying again. During this waiting period, any similar requests from the second client 110 for the expired answer will result in error messages. Yet, the one or more remote DNS server systems 108 may return to accessibility during this waiting period. The result is a period of time where the second client 110 receives error messages in response to its queries despite the fact that the one or more remote DNS server systems 108 are accessible again.

This disclosure overcomes this problem by enabling the TTL value to be modified (e.g., increased or reset) or allowing the DNS server system 104 to ignore the TTL. In this way, the DNS server system 104 can continue to provide the expired answer from its local cache 112 to the second client 110 even after the TTL has expired and where communication with the one or more remote DNS server systems 108 is not possible. In other words, when the TTL has expired and the DNS server system 104 queries the one or more remote DNS server systems 108 but cannot receive an answer, the DNS server system 104 can fall back on returning the expired answer to the second client 110 rather than providing an error.

In particular, the DNS server system 104 includes an outage avoidance system 114 that can respond to queries from the second client 102, return answers if available, and if not, determine if an expired answer exists in the local cache 112. If an expired answer to the second client's 110 question is in the local cache 112, then the outage avoidance system 114 can modify or ignore the TTL value for the answer, and return the expired answer to the second client 110.

This ability is a boon to high-volume, dynamic, and essential websites since it allows clients to continue accessing the website even where the website or networks see temporary outages or interruptions.

In an optional embodiment, a proxy DNS server system 120 can be arranged between the first client 102 (and/or the second client 110) and the DNS server system 104. The proxy DNS server system 120 can include functionality of a switch, load balancer, filter, or DNS proxy to name a few non-limiting examples. In some cases the DNS proxy server system 120 can include a local cache 116 for storing answers to the most common DNS queries from clients. In such a case the proxy DNS server system 120 is able to answer high volume and frequent DNS queries, thus removing load from the DNS server system 104.

In an embodiment, the proxy DNS server system 120 can serve a plurality of DNS server systems 104, for instance by load balancing—diving up queries to different servers in a server cluster. Since not all DNS servers in the cluster may have the outage avoidance system 114, the proxy DNS server system 120 can include an outage avoidance system 118. When a DNS server returns an empty answer or an error message to the proxy DNS server system 120 in response to a query from the second client 120, the outage avoidance system 118 can check the local cache 116 for an expired answer to the query. If an expired answer exists, then the outage avoidance system 118 can modify the TTL value to a valid value or ignore the expired TTL value. Either way, the outage avoidance system 118 then returns the expired answer to the second client 120 despite the responding DNS server not having an outage avoidance system and not being able to provide an answer. Where a DNS server has the outage avoidance system 114, the outage avoidance system 118 of the proxy DNS server system 120 is redundant and will likely not be applied to communications from the DNS server having the outage avoidance system 114.

A "server system" can include one or more servers. In some instances, the one or more servers can exist in a "cluster." Clusters can include a plurality of servers within the same structure or within a same geographic area or region. Servers in a cluster can communicate with each other via direct wired communication connections, yet this communication can be governed by the Internet Protocol. In other instances, other network types including the Internet can separate servers within a cluster.

The one or more remote DNS server systems 108 can include one or more related or unrelated servers. For instance, the one or more remote DNS server systems 108 can include the following two unrelated DNS servers: a VERIZON DNS server and a COMCAST DNS server. Yet, in another example, the one or more remote DNS server systems 108 can include a single DNS server for STARBUCKS.

The DNS answers can store and transmit a variety of data including IP addresses, mail exchange records, and error messages, to name two non-limiting examples. An example of an error message being returned as an answer is where a query for "no_such_name_at_all.comcast.net" is made, and no such domain exists. The answer might include an error message such as "NXDOMAIN" (or no such domain exists) Like answers that include an IP address or other information, this answer can be cached in the local cache 112 or the local cache 116 for use when the same or similar queries are received.

In some embodiments, an error can include an error code including any valid DNS error code. In other embodiments, an error can include can "empty" answer, or an answer data packet having an empty or missing "answer section" or answer field. An error can also include a lack of response from the one or more remote DNS server systems 108 after a set period of time, such as a timeout period. Exemplary error messages include, but are not limited to, FORMERR, SERVFAIL, NXDOMAIN, and NOTIMP. For the purposes of this disclosure, a DNS server includes a server capable of answering recursive DNS queries (e.g., a recursive DNS server). The one or more remote DNS server systems can be a single server, set of servers, multiple distinct servers, or multiple distinct sets of servers, that a DNS server looks to when a query cannot be answered via looking to a local cache of the DNS server.

Although illustrated as laptops, one of skill in the art will recognize that the clients 102, 110 can be implemented as any of a variety of different computing systems such as laptops, desktops, ultrabooks, smartphones, tablet computers, and many others. The server systems 104, 106, 120 can be implemented as software or firmware distributed amongst one or more servers located in one or more different locations or as one or more hardware components at one or more locations. For instance, the DNS server system 104 may comprise a cluster of multiple servers in a geographic region.

The target server system 106 can include any device or application associated with an IP address. For instance, the target server system 106 can be a host, such as a web server or web server system. In other embodiments, the target server system 106 can include a single computing device, such as an Internet telephone or an Internet telephone software program or application. The target server system 106 can be a smartphone or tablet computer, to name two further examples.

The optional proxy DNS server system 120 can be embodied by any system that mediates communications between the clients 102, 110 and the DNS server system 104. For instance, the proxy DNS server system 120 can be a proxy, an intelligent cache, a firewall, a switch, or a load balancer, to name a few non-limiting examples.

Figure 2:
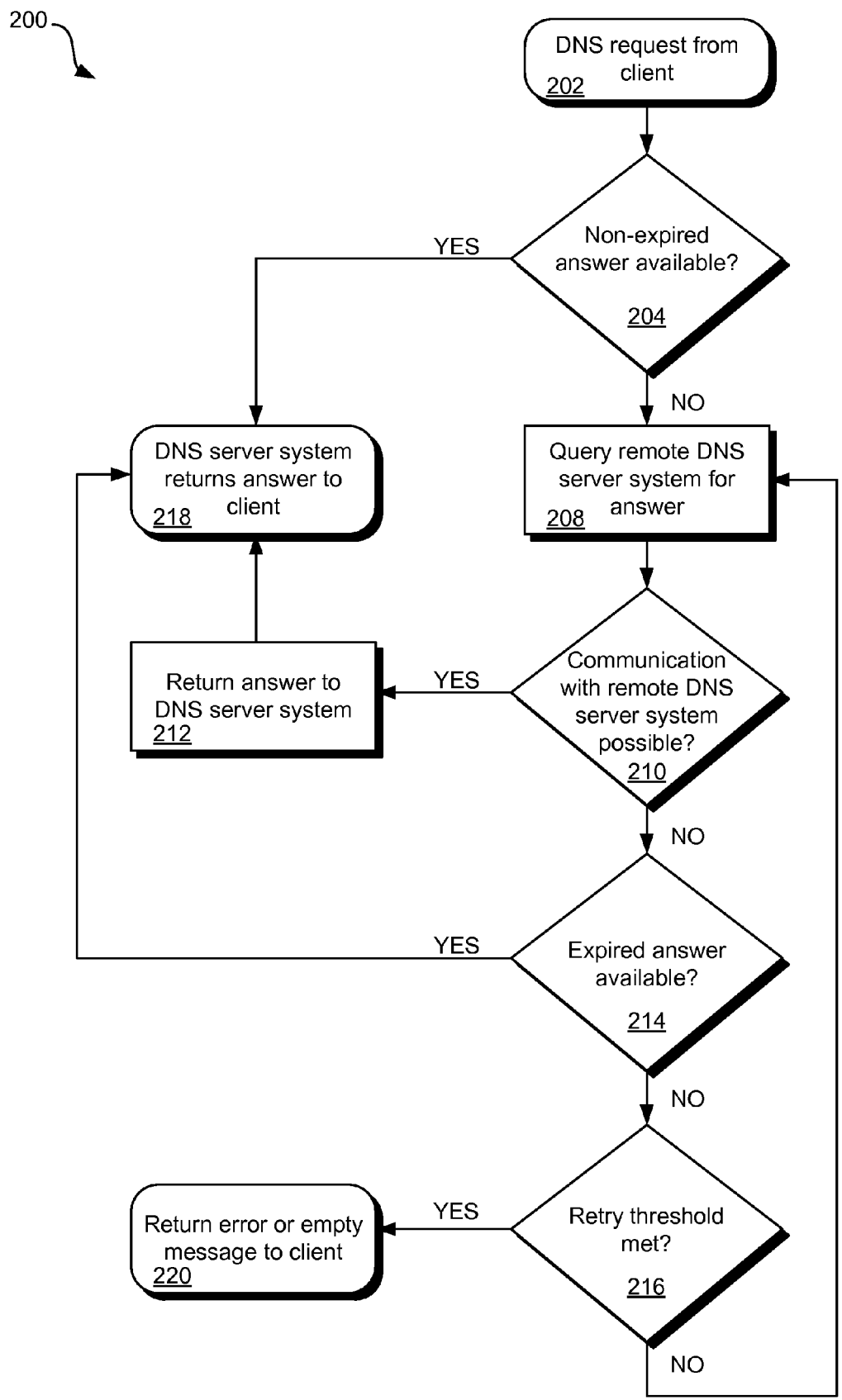
FIG. 2 illustrates one method for a DNS server system to answer a client request for a domain name or hostname IP address when a temporary outage of the domain or host or interruption of communication between DNS server systems occurs.

FIG. 2 illustrates one method 200 for a DNS server system to answer a client request for a domain name or hostname IP address when a temporary outage of the domain or host or interruption of communication between DNS server systems occurs. The method 200 includes a client (e.g., 102 in FIG. 1) or server making a DNS request to a DNS server system (block 202), such as the DNS server system 104 in FIG. 1. The DNS server system then determines whether it already has an answer to the request and whether such an answer is expired or not (e.g., data having a non-expired TTL) (decision 204). If the DNS server system has an answer and the answer is not expired, then the answer is returned to the client (block 218). If not, or if the TTL is expired, then the DNS server system queries one or more remote DNS server systems (e.g., one or more remote DNS server systems 108 in FIG. 1) for the answer (block 208). If communication with the one or more remote DNS server systems is possible (decision 210), then the one or more remote DNS server systems return the answer to the DNS server system (block 212) and a TTL of the new answer begins to run. The DNS server system can then return the answer to the client (block 218). If communication is not possible (e.g., the answer is empty, an error message is returned, or there is no response), then the DNS server system determines if it has an expired answer (e.g., in a local cache) (decision 214). If not, then the DNS server system again queries the remote DNS server system for an answer (block 208) until either an answer can be obtained (decision 210 or 214) or a threshold number of retry attempts have been made (decision 216). Then the DNS server system returns an error message or empty answer to the client (block 220).

Figure 3:
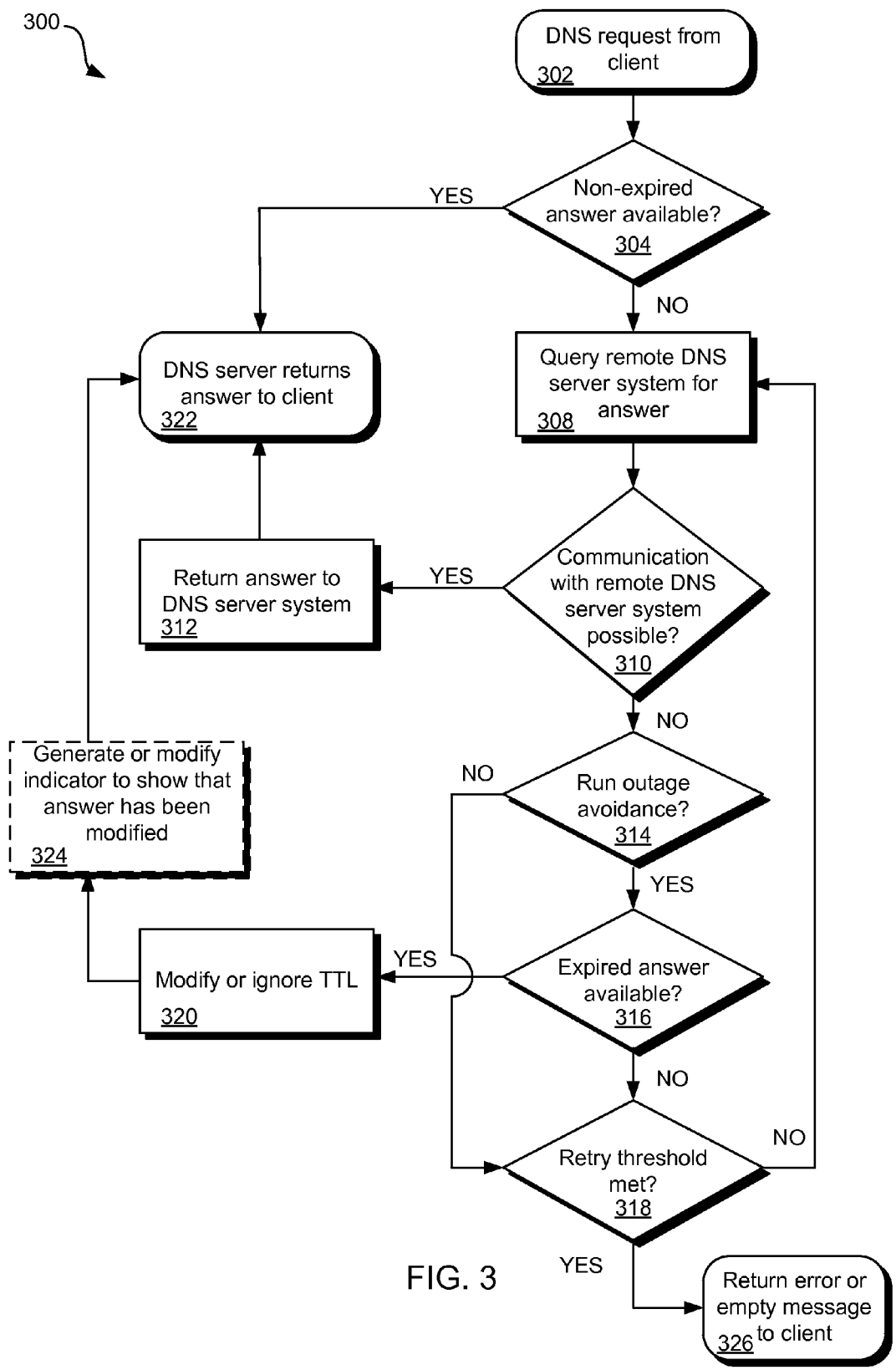
FIG. 3 illustrates a variation of the method illustrated in FIG. 2 that includes selective application of DNS outage avoidance.

The method illustrated in FIG. 2 can be selectively applied as illustrated in FIG. 3. The method 300 illustrated in FIG. 3 involves a client or server making a DNS request to a DNS server system (block 302). The DNS server system then determines whether it already has a non-expired answer to the request in a determination (block 304). If it does, then it returns the expired answer to the client (block 322). If not, or if the TTL is expired, then the DNS server system queries one or more remote DNS server systems for the answer (block 308). If communication is possible (decision 310), then the one or more remote DNS server systems return the answer to the DNS server system (block 312) and a TTL of the new answer begins to run. The DNS server system can then return the answer to the client (block 322).

If communication with the one or more remote DNS server systems is not possible (e.g., the answer is empty, includes an error message, or no response is received), then a set of rules and data sources can be used to determine whether the method 300 (outage avoidance) should look to an expired answer in local cache or send an indication that the answer was empty, included an error message, or no response is received (decision 314). In one instance, this means determining whether the name in the query is on a list of critical domains. In other words, the method 300 may try to return an expired answer only where the name in the query is on the critical list of domains (e.g., an important enough domain to warrant the risks of using an expired answer). If outage avoidance is not to operate, then the DNS server system again queries the remote DNS server system for an answer (block 308) until either an answer can be obtained (decision 310 or 316) or a threshold number of retry attempts have been made (decision 318). Then the DNS server system returns an error message or an empty answer to the client (block 326).

If outage avoidance is to operate (e.g., the name is on the list of critical domains), then the DNS server system determines if it has an expired answer (block 316), for instance by consulting a local cache (e.g., 112 in FIG. 1) for an expired answer to the query. If there is no expired answer, then the DNS server system again queries the remote DNS server system for an answer (block 308) until either an answer can be obtained (decision 310 or 316) or a threshold number of retry attempts have been made (decision 318). Then the DNS server system returns an error message or empty answer to the client (block 326). If an expired answer is found in the local cache (decision 316), then a TTL of the expired answer can be modified or ignored (block 320). In the case of updating the TTL, the TTL can be set to expire some time from the present (e.g., 30 seconds). Whether the TTL is extended or ignored, the method 300 next provides the valid answer (no longer expired if the TTL has been extended) to the client (block 322). The method 300 may optionally generate or modify an indicator showing that the answer has been modified (block 324) before returning the expired answer to the client (block 322). The indicator can be associated with or a part of the cached answer. Modifying the indicator may be in order where the TTL was previously modified and an indicator was created to indicate that such a modification occurred.

Some examples of critical domains could include high value domains (e.g., GOOGLE and FACEBOOK), high traffic domains, domains that stream or constantly update websites (e.g., financial websites), and service domains for the domain provider, to name a few.

Figure 4:
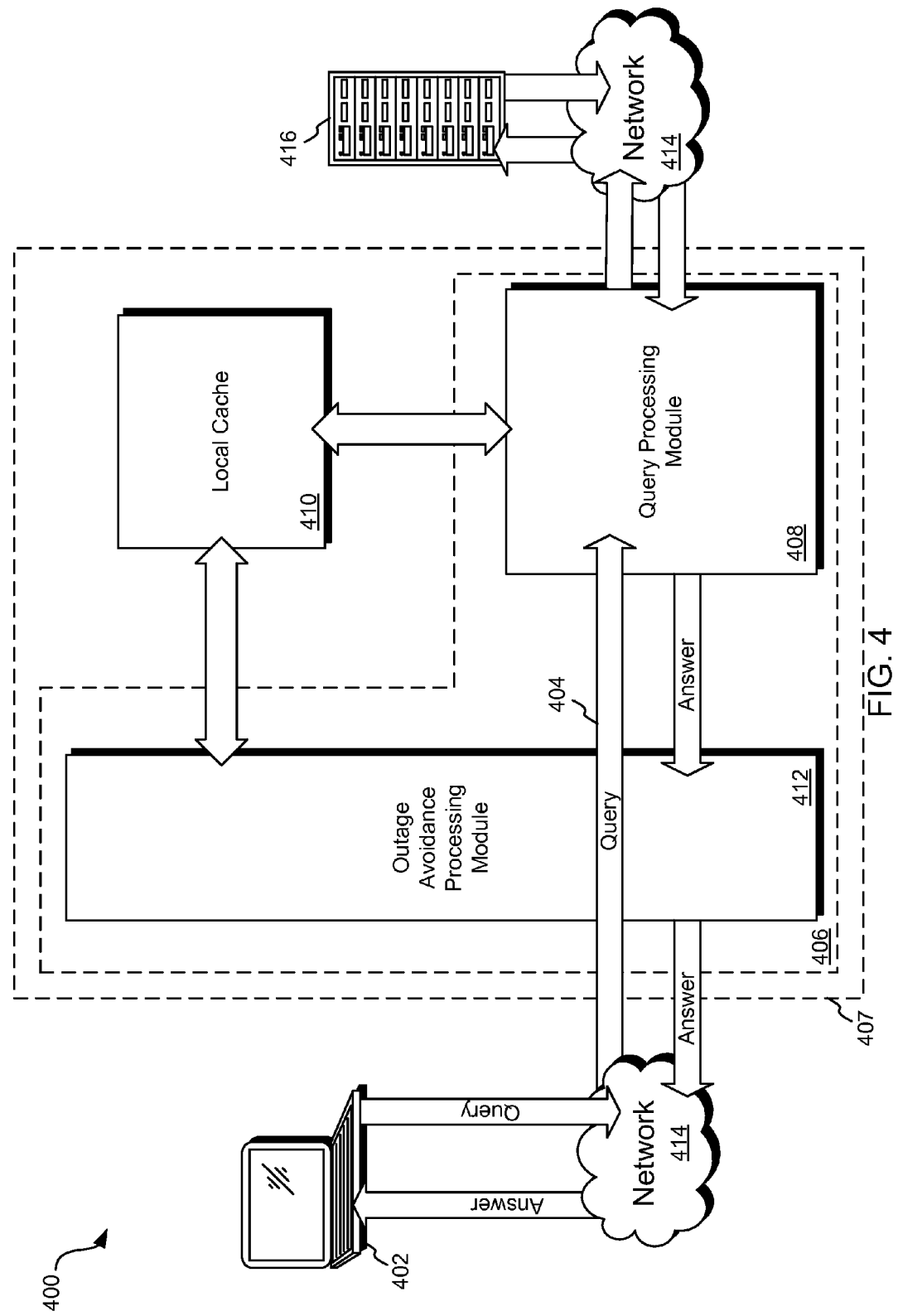
FIG. 4 illustrates another system configured to service client Internet activity.

FIG. 4 illustrates another system configured to service client Internet activity. The system 400 includes a client or server 402 that makes a DNS query 404 for a URL. The query 404 is passed to an outage avoidance system 406 (e.g., outage avoidance system 114 in FIG. 1) residing on a DNS server system 407 such as a DNS server system (e.g., DNS server system 104 in FIG. 1). The server system 407 includes a local cache (e.g., local cache 112 in FIG. 1). The outage avoidance system 406 includes a query processing module 408 and an outage avoidance processing module 412.

The query 404 can be initially processed by the query processing module 408, which may check the local cache 410 for an answer to the query. Common answers or answers that the DNS server system 407 has responded to previously may be found in the local cache 410. However, where an answer is not in the local cache 410 or a TTL value associated with the answer has expired, the query processing module 408 passes the query to one or more remote DNS server systems 416 via the network 414. The one or more remote DNS server systems 416 may be an authoritative DNS server system, a proxy to an authoritative DNS server system, a server running DNS script, or some other server system that is more likely to know the answer than the DNS server system 407. The query processing module 408 can handle any responses from the one or more remote DNS server systems 407.

If the query 404 cannot be answered because communication with the one or more remote DNS server systems 416 is not possible (e.g., the answer is empty, an error, or there is no response), then the query processing module 408 generates an error or other message that triggers the outage avoidance processing module 412 to optionally evaluate the query 404 to determine whether an outage avoidance method should be applied (e.g., block 314 in FIG. 3).

If the query 404 qualifies (e.g., if the query 404 is for a URL on a list of critical domains), then the query processing module 412 can check the local cache 410 to see if an expired answer to the query 404 exists. If found, the outage avoidance module 412 can modify the answer's TTL value. Modification of the TTL value can include extended or resetting the TTL value, for instance, resetting the TTL value to expire 30 seconds from the present. The outage avoidance processing module 412 can then send the previously-expired answer to the client or server 402 as an answer to the query 404. In some embodiments, the outage avoidance processing module 412 intercepts error messages from the query processing module 408, and in response, checks the local cache 410 for an expired answer. In contrast, when valid answers are sent from the query processing module 406 back to the client 402, the outage avoidance module 412 can allow these answers to pass without interception.

In non-illustrated embodiments, the outage avoidance system 406 can be a standalone system that works in concert with the DNS server system 407, such as a DNS proxy server system (e.g., proxy DNS server system 120 in FIG. 1), a network packet filter, or a combination of the two, to name three examples. In an alternative embodiment, the outage avoidance system 406 can be implemented in both a proxy DNS server system and the DNS server system 407 where the proxy DNS server system acts as a frontend to the DNS server system 407. An example of this can be seen in FIG. 1 in the optional embodiment where the proxy DNS server system 120 is a frontend to the DNS server system 104 and both outage avoidance systems 118, 114 are implemented.

Figure 5:
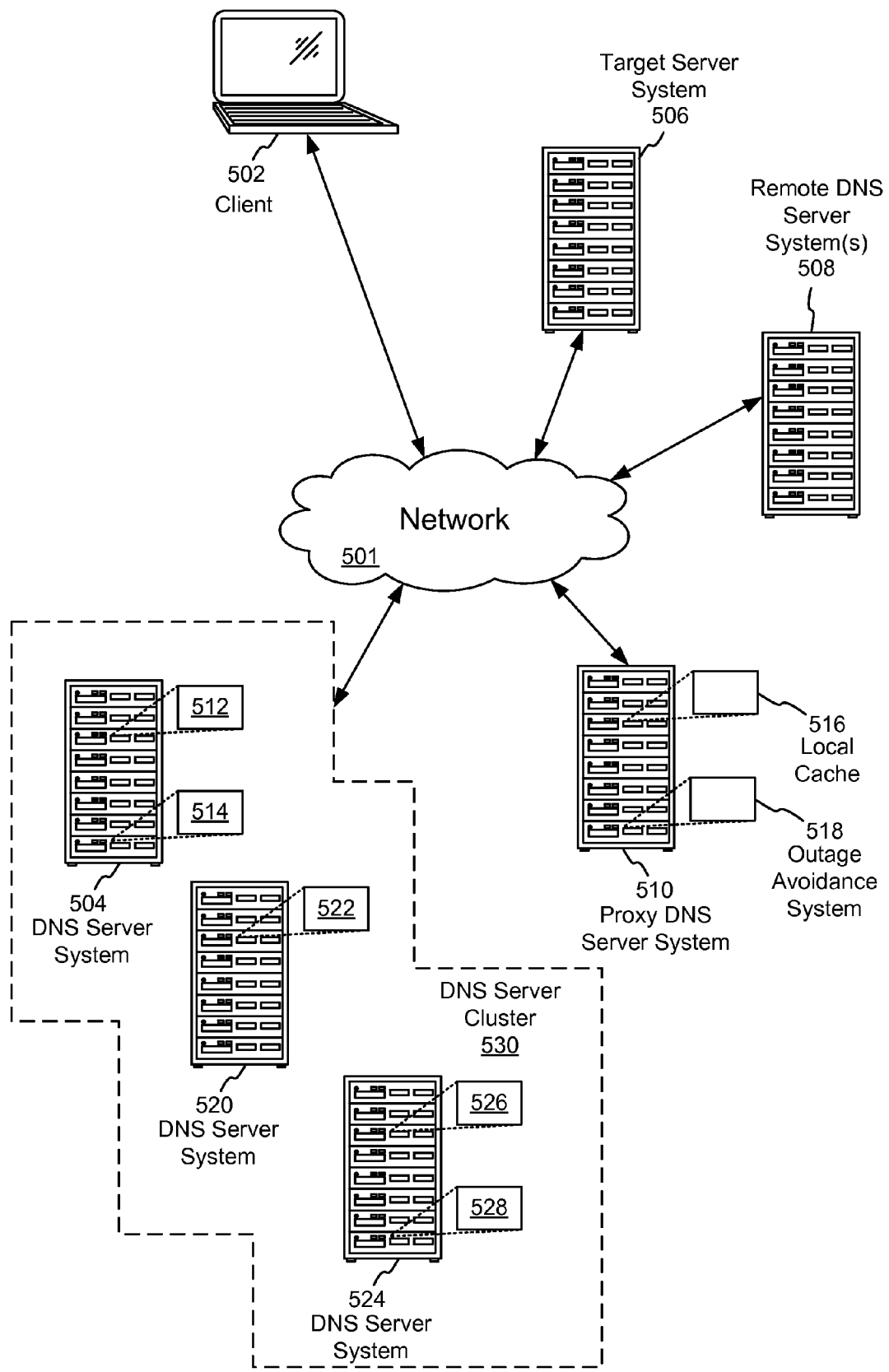
FIG. 5 illustrates a system configured to service client Internet activity.

FIG. 5 illustrates a system configured to service client Internet activity. The system 500 includes a network 501 (e.g., the Internet or a network including the Internet) that enables communication between a client 102 and a DNS server cluster 530, where such communication is mediated by a proxy DNS server system 510. The network 501 further enables communication between the DNS server cluster 530 and a one or more remote DNS server systems 508 (e.g., an authoritative DNS server system). The network 501 also enables communication between the client 502 and a target server system 506—the server system hosting data and services that the client 502 is attempting to access and utilize.

Since the client 502 only has a domain name of the target server system 506, but not its IP address, the client 502 makes a DNS query. The query is received at the proxy DNS server system 510 and then passed to one of the DNS server systems 504, 520, 524 in the DNS server cluster 530. The DNS server system 504, 520, 524 that receives the query may be able to respond with an answer by returning an answer stored in a local cache 512, 522, 526 of the DNS server system 504, 520, 522 that is handling the query. Such an answer would be returned via the proxy DNS server system 510. The proxy DNS server system 510 can include a local cache 516 that stores answers to frequent queries (e.g., IP addresses for FACEBOOK and GOOGLE).

If an answer is not found in the local cache 512, 522, 526 of the DNS server system 504, 520, 524 handling the query, then the query can be forwarded to the one or more remote DNS server systems 508, such as an authoritative DNS server. The one or more remote DNS server systems 508 may return an answer that can be cached in the local cache 512, 522, 526 and returned to the client 502 via the proxy DNS server system 510.

However, in some cases the one or more remote DNS server systems 508 may not return an answer or may return an error message. When this happens, and the query is being handled by a DNS server system 504, 524 having an outage avoidance module 514, 528, the outage avoidance module 514, 528 can check the local cache 512, 526 for an expired answer. If one is found, then the expired answer can be returned to the client 502 via the proxy DNS server system 510 as was described previously with reference to FIGS. 1 and 4.

If the DNS server system 520 handling the query does not have an outage avoidance module, then the DNS server system 520 does not check for and attempt to return an expired answer, but instead passes an indication to the proxy DNS server system 510 that communication was not possible (e.g., an error message or empty answer, to name two non-limiting examples. The proxy DNS server system 510 can include an outage avoidance system 518 that receives the empty answer or error message and checks the local cache 518 for an expired answer to the query. If one is found, then the outage avoidance system 518 can modify the TTL value of the expired answer or ignore the TTL value, and return the expired answer to the client 502.

In some situations, no DNS server systems may have an outage avoidance system and thus outage avoidance can only be practiced at the proxy DNS server system 510.

Figure 6:
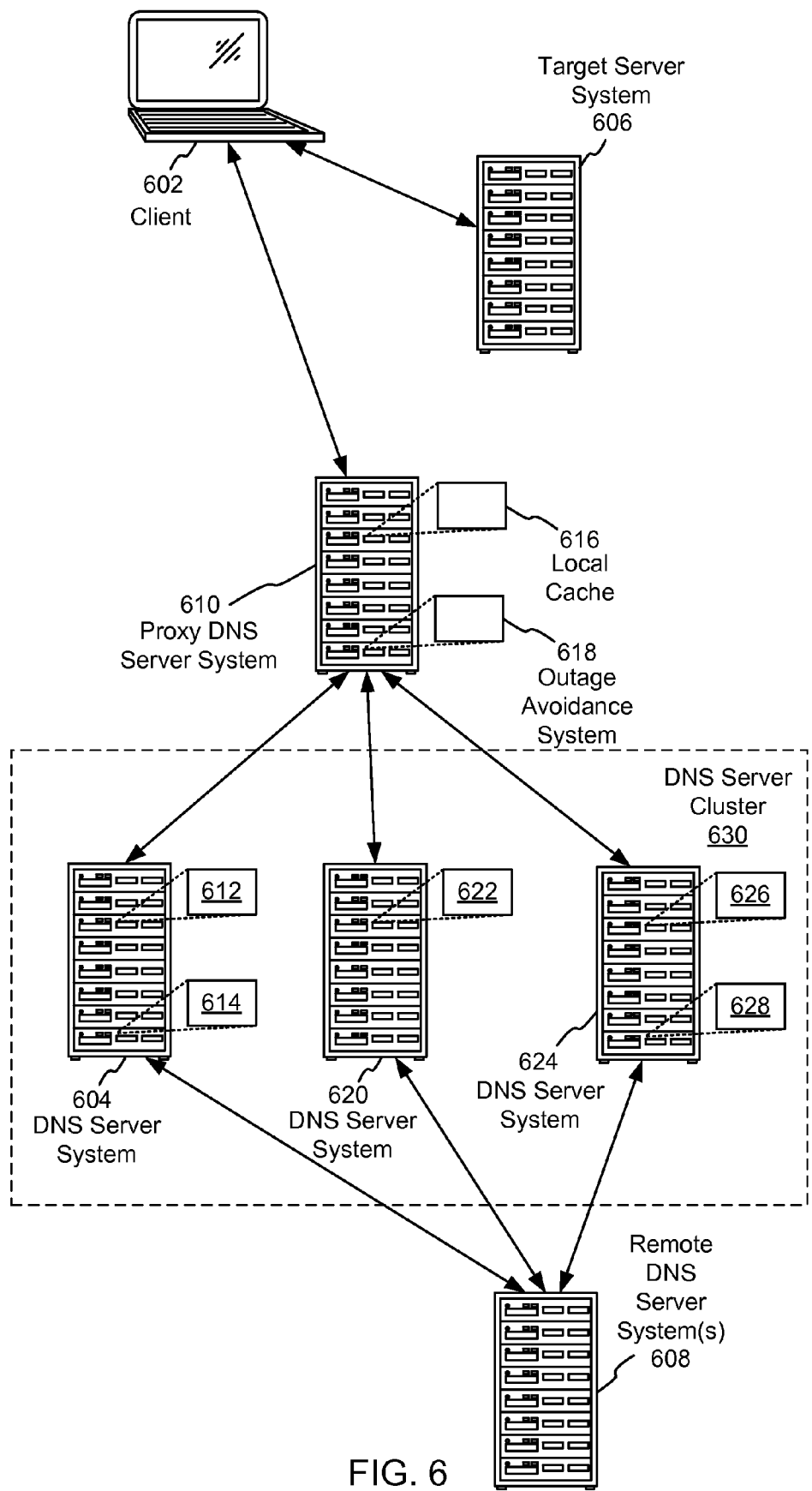
FIG. 6 illustrates another way to view the flow of communications between system components of FIG. 5.

FIG. 6 illustrates another way to view the flow of communications between system components of FIG. 5. Here, a client 602 makes a query that is distributed to a DNS server system 604, 620, 624 in a DNS server cluster 630 by a proxy DNS server system 610. If the answer cannot be found in a local cache 612, 622, 626, then the query is passed to one or more remote DNS server systems 608. If an empty answer or an error message is returned, or there is no response, then an outage avoidance system 614, 628 in the DNS server system 604, 624 can search for an expired answer to the query in the local cache 612, 626 and return the expired answer if found. However, if the query is handled by a DNS server system 620 not having an outage avoidance system, then the DNS server system 620 may pass an indicator back to the proxy DNS server system 610 indicating that a response from the one or more remote DNS server systems 608 was not possible. When this happens, an outage avoidance system 618 in the proxy DNS server system 610 can search a local cache 616 for an expired answer to the query and return the expired answer to the client 602 if one exists. The client 602 can then use the answer, whether expired or not, to communicate with the target server system 606.

Figure 7:
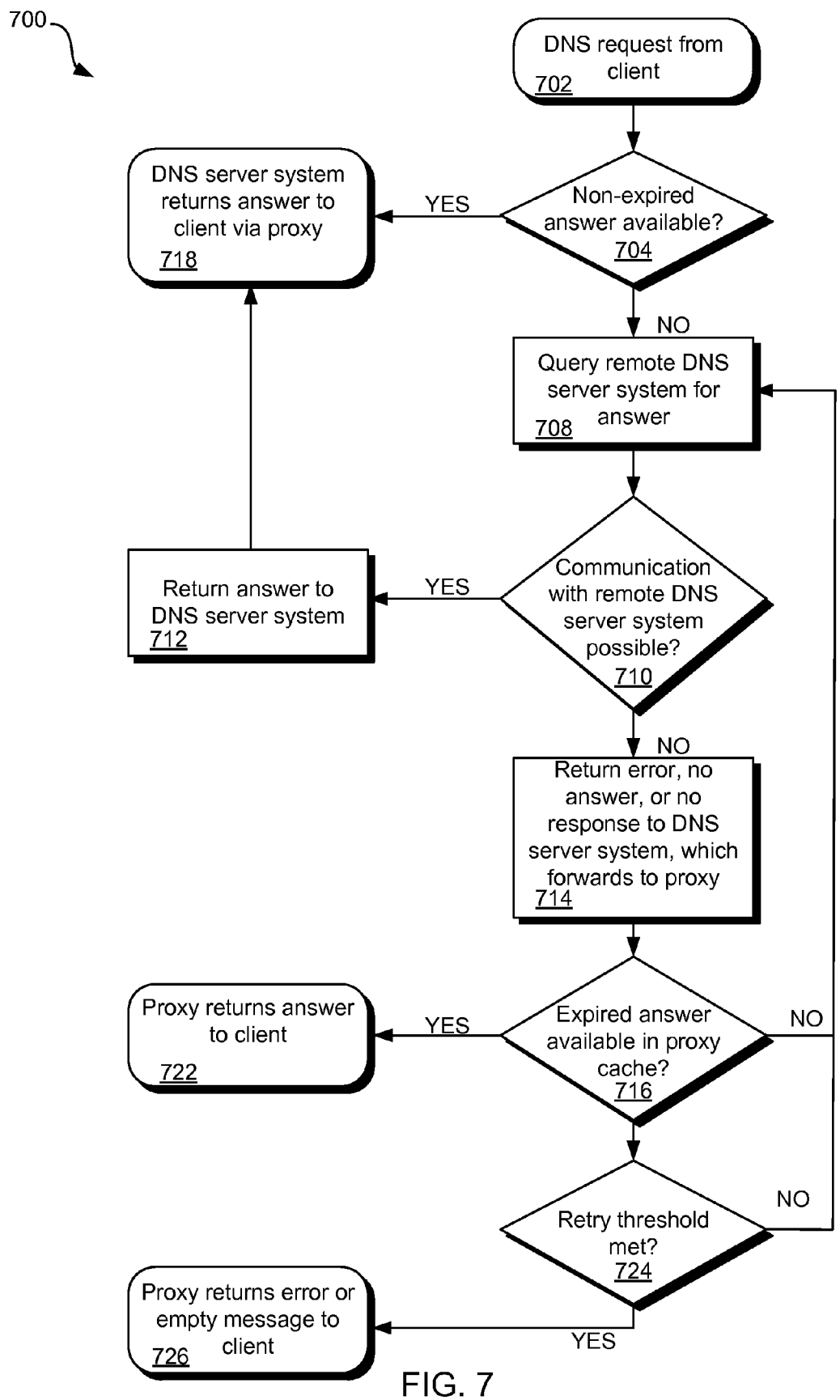
FIG. 7 illustrates one method for a DNS server cluster to answer a client request for a domain name or hostname IP address when a temporary outage of the domain or host or interruption of communication between DNS server systems occurs and where a DNS proxy acts as a frontend to the DNS server cluster.

FIG. 7 illustrates one method 700 for a DNS server cluster to answer a client request for a domain name or hostname IP address when a temporary outage of the domain or host or interruption of communication between DNS server systems occurs and where a DNS proxy acts as a frontend to the DNS server cluster. The method 700 includes a client (e.g., 502 in FIG. 5 or 602 in FIG. 6) or server making a query to a DNS server cluster (block 702), such as the DNS server cluster 504 in FIG. 5 or 607 in FIG. 6. The query is mediated by a proxy DNS server system and passed to one of a plurality of DNS server systems within the DNS server cluster. The DNS server system assigned to handle the query determines whether it already has an answer to the request and whether such an answer is expired or not (e.g., data having a non-expired TTL) (decision 704). If the DNS server system has an answer and the answer is not expired, then the answer is returned to the client via the proxy DNS server system (block 718). If not, or if the TTL is expired, then the DNS server system queries one or more remote DNS server systems (e.g., one or more remote DNS server systems 108 in FIG. 1) for the answer (block 708). If communication with the one or more remote DNS server systems is possible (decision 710), then the one or more remote DNS server systems return the answer to the DNS server system (block 712) and a TTL of the new answer begins to run. The DNS server system can then return the answer to the client (block 718) via the proxy. If communication is not possible (e.g., the answer is empty, or an error, or there is no response), then the DNS server system, assuming it lacks an outage avoidance module (e.g., DNS server system 520) passes an indicator back to the proxy DNS server system (block 714) indicating that an answer could not be obtained from the remote DNS server system. The proxy DNS server system, via an outage avoidance module, then determines if the local cache (e.g., local cache 516) has an expired answer. If so, then the proxy DNS server system modifies the TTL value of the expired answer or ignores the TTL value and returns the expired answer to the client (block 722). If not, then the proxy DNS server again queries the remote DNS server system for an answer (block 708) until either an answer can be obtained (decision 710 or 716) or a threshold number of retry attempts have been made (decision 324). Then the DNS server system returns an error message or empty answer to the client (block 726).

Assuming that the proxy DNS server system 510 instructs the same DNS server system to perform subsequent attempts to reach the one or more remote DNS server systems, the proxy DNS server system will always check its local cache for an expired answer. However, in an alternative embodiment, the proxy DNS server system 510 can instruct different DNS server systems to perform subsequent requests to the one or more remote DNS server systems. In some cases the proxy DNS server system 510 can instruct a DNS server system that is known to have an outage avoidance system to handle subsequent requests to the non-responsive one or more remote DNS server systems.

Just as the method 200 can be selectively applied as illustrated and described with reference to FIG. 3, the method 700 can also be selectively applied based on similar rules and methods.

For the purposes of this disclosure, a "proxy DNS server" or "proxy DNS server system" can include any server system that mediates DNS queries from a client to a DNS server as well as answers from the DNS server to the client. A proxy DNS server system can include functionality of a switch or load balancer (e.g., sending different queries to different DNS servers or to different DNS servers in a cluster). Switching can be based on load balancing or logical rules dictating what types of queries are preferentially directed to certain DNS servers. The proxy DNS server system may also include functionality of a firewall. Any combination of the above functionalities may also be included in what this disclosure refers to as a proxy DNS server or proxy DNS server system.

Figure 8:
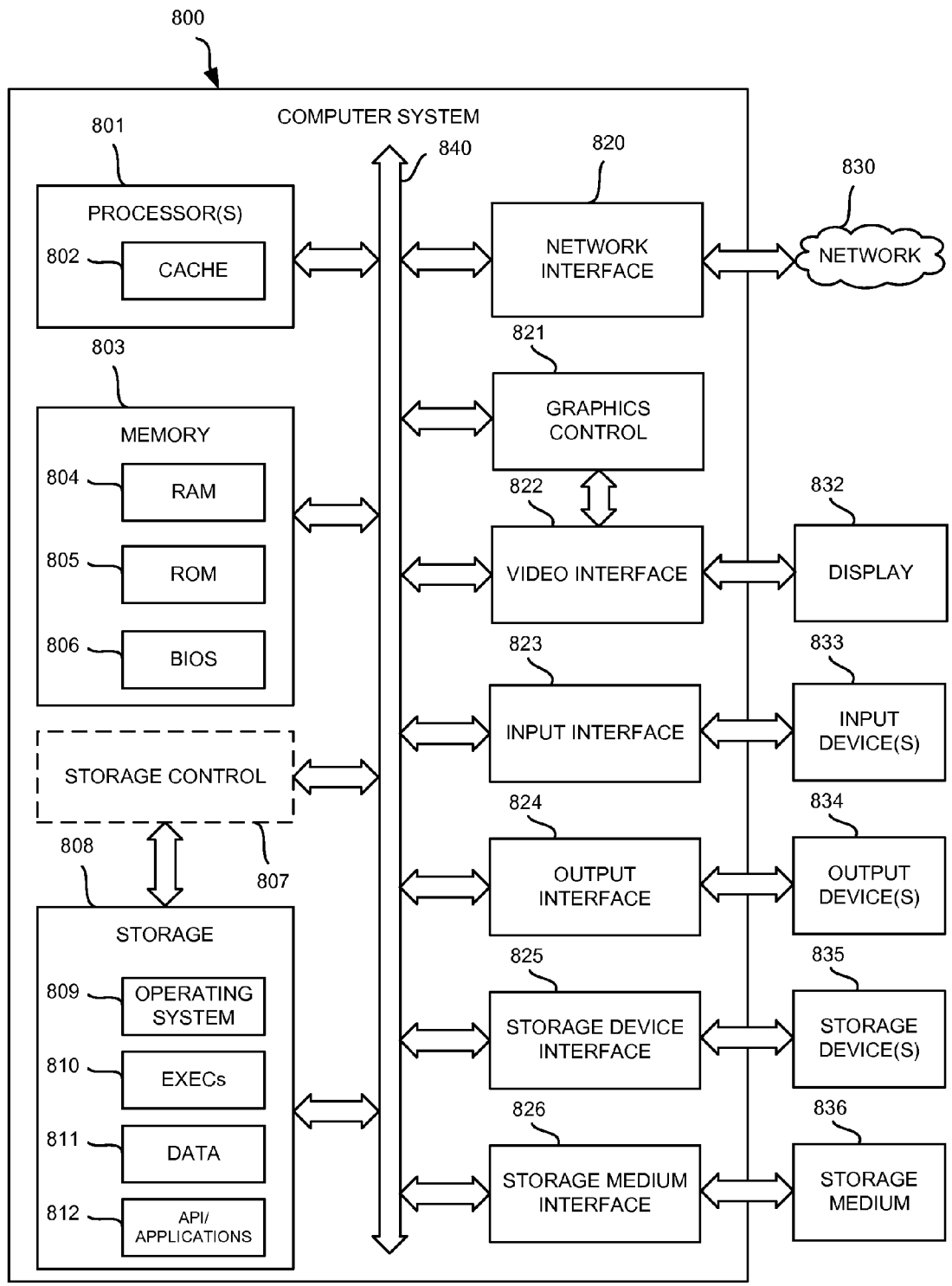
FIG. 8 shows a diagrammatic representation of one embodiment of a machine in the exemplary form of a computer system.

The systems and methods described herein can be implemented in a machine such as a computer system in addition to the specific physical devices described herein. FIG. 8 shows a diagrammatic representation of one embodiment of a machine in the exemplary form of a computer system 800 within which a set of instructions can execute for causing a device to perform or execute any one or more of the aspects and/or methodologies of the present disclosure. The components in FIG. 8 are examples only and do not limit the scope of use or functionality of any hardware, software, embedded logic component, or a combination of two or more such components implementing particular embodiments.

Computer system 800 may include a processor 801, a memory 803, and a storage 808 that communicate with each other, and with other components, via a bus 840. The bus 840 may also link a display 832, one or more input devices 833 (which may, for example, include a keypad, a keyboard, a mouse, a stylus, etc.), one or more output devices 834, one or more storage devices 835, and various tangible storage media 836. All of these elements may interface directly or via one or more interfaces or adaptors to the bus 840. For instance, the various tangible storage media 836 can interface with the bus 840 via storage medium interface 826. Computer system 800 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Processor(s) 801 (or central processing unit(s) (CPU(s))) optionally contains a cache memory unit 802 for temporary local storage of instructions, data, or computer addresses. Processor(s) 801 are configured to assist in execution of computer readable instructions. Computer system 800 may provide functionality as a result of the processor(s) 801 executing software embodied in one or more tangible computer-readable storage media, such as memory 803, storage 808, storage devices 835, and/or storage medium 836. The computer-readable media may store software that implements particular embodiments, and processor(s) 801 may execute the software. Memory 803 may read the software from one or more other computer-readable media (such as mass storage device(s) 835, 836) or from one or more other sources through a suitable interface, such as network interface 820. The software may cause processor(s) 801 to carry out one or more processes or one or more steps of one or more processes described or illustrated herein. Carrying out such processes or steps may include defining data structures stored in memory 803 and modifying the data structures as directed by the software.

The memory 803 may include various components (e.g., machine readable media) including, but not limited to, a random access memory component (e.g., RAM 804) (e.g., a static RAM "SRAM", a dynamic RAM "DRAM, etc.), a read-only component (e.g., ROM 805), and any combinations thereof. ROM 805 may act to communicate data and instructions unidirectionally to processor(s) 801, and RAM 804 may act to communicate data and instructions bidirectionally with processor(s) 801. ROM 805 and RAM 804 may include any suitable tangible computer-readable media described below. In one example, a basic input/output system 806 (BIOS), including basic routines that help to transfer information between elements within computer system 800, such as during start-up, may be stored in the memory 803.

Fixed storage 808 is connected bidirectionally to processor(s) 801, optionally through storage control unit 807. Fixed storage 808 provides additional data storage capacity and may also include any suitable tangible computer-readable media described herein. Storage 808 may be used to store operating system 809, EXECs 810 (executables), data 811, APV applications 812 (application programs), and the like. Often, although not always, storage 808 is a secondary storage medium (such as a hard disk) that is slower than primary storage (e.g., memory 803). Storage 808 can also include an optical disk drive, a solid-state memory device (e.g., flash-based systems), or a combination of any of the above. Information in storage 808 may, in appropriate cases, be incorporated as virtual memory in memory 803.

In one example, storage device(s) 835 may be removably interfaced with computer system 800 (e.g., via an external port connector (not shown)) via a storage device interface 825. Particularly, storage device(s) 835 and an associated machine-readable medium may provide nonvolatile and/or volatile storage of machine-readable instructions, data structures, program modules, and/or other data for the computer system 800. In one example, software may reside, completely or partially, within a machine-readable medium on storage device(s) 835. In another example, software may reside, completely or partially, within processor(s) 801.

Bus 840 connects a wide variety of subsystems. Herein, reference to a bus may encompass one or more digital signal lines serving a common function, where appropriate. Bus 840 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 800 may also include an input device 833. In one example, a user of computer system 800 may enter commands and/or other information into computer system 800 via input device(s) 833. Examples of an input device(s) 833 include, but are not limited to, an alpha-numeric input device (e.g., a keyboard), a pointing device (e.g., a mouse or touchpad), a touchpad, a joystick, a gamepad, an audio input device (e.g., a microphone, a voice response system, etc.), an optical scanner, a video or still image capture device (e.g., a camera), and any combinations thereof. Input device(s) 833 may be interfaced to bus 840 via any of a variety of input interfaces 823 (e.g., input interface 823) including, but not limited to, serial, parallel, game port, USB, FIREWIRE, THUNDERBOLT, or any combination of the above.

In particular embodiments, when computer system 800 is connected to network 830, computer system 800 may communicate with other devices, specifically mobile devices and enterprise systems, connected to network 830. Communications to and from computer system 800 may be sent through network interface 820. For example, network interface 820 may receive incoming communications (such as requests or responses from other devices) in the form of one or more packets (such as Internet Protocol (IP) packets) from network 830, and computer system 800 may store the incoming communications in memory 803 for processing. Computer system 800 may similarly store outgoing communications (such as requests or responses to other devices) in the form of one or more packets in memory 803 and communicated to network 830 from network interface 820. Processor(s) 801 may access these communication packets stored in memory 803 for processing.

Examples of the network interface 820 include, but are not limited to, a network interface card, a modem, and any combination thereof. Examples of a network 830 or network segment 830 include, but are not limited to, a wide area network (WAN) (e.g., the Internet, a network including the Internet, an enterprise network), a local area network (LAN) (e.g., a network associated with an office, a building, a campus or other relatively small geographic space), a telephone network, a direct connection between two computing devices, and any combinations thereof. A network, such as network 830, may employ a wired and/or a wireless mode of communication. In general, any network topology may be used.

Information and data can be displayed through a display 832. Examples of a display 832 include, but are not limited to, a liquid crystal display (LCD), an organic liquid crystal display (OLED), a cathode ray tube (CRT), a plasma display, and any combinations thereof. The display 832 can interface to the processor(s) 801, memory 803, and fixed storage 808, as well as other devices, such as input device(s) 833, via the bus 840. The display 832 is linked to the bus 840 via a video interface 822, and transport of data between the display 832 and the bus 840 can be controlled via the graphics control 821.

In addition to a display 832, computer system 800 may include one or more other peripheral output devices 834 including, but not limited to, an audio speaker, a printer, and any combinations thereof. Such peripheral output devices may be connected to the bus 840 via an output interface 824. Examples of an output interface 824 include, but are not limited to, a serial port, a parallel connection, a USB port, a FIREWIRE port, a THUNDERBOLT port, and any combinations thereof.

In addition or as an alternative, computer system 800 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a computer-readable medium may encompass a circuit (such as an IC) storing software for execution, a circuit embodying logic for execution, or both, where appropriate. The present disclosure encompasses any suitable combination of hardware, software, or both.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A domain name system (DNS) server system comprising:
    a local cache storing cached DNS answers from previous DNS queries, each of the cached DNS answers having a time-to-live (TTL) value, cached DNS answers having an expired TTL value are expired DNS answers;
    an outage avoidance system comprising:
        a query processing module that:
            is configured to receive a DNS query from a client;
            checks the local cache for a non-expired DNS answer to the DNS query; and upon not finding one,
            is configured to pass the DNS query to a remote DNS server system;
            is configured to receive an empty answer, an error message, or no response from the remote DNS server system; and
        an outage avoidance processing module that is configured to, upon indication that the query processing module received an empty answer, an error message, or no response:
            check the local cache for an expired answer to the DNS query; and
            return the expired answer to the client.

2. The DNS server system of claim 1, wherein the outage avoidance processing module modifies a TTL value of the expired answer as part of returning the expired answer to the client.

3. The DNS server system of claim 1, wherein the outage avoidance processing module ignores the TTL value of the expired answer as part of returning the expired answer to the client.

4. The DNS server system of claim 1, wherein a proxy DNS server system is configured to mediate communications between the client and the DNS server system.

5. The DNS server system of claim 4, wherein the DNS server system is part of a cluster of DNS server systems.

6. The DNS server system of claim 5, wherein the proxy DNS server system comprises:
    a local cache; and
    an outage avoidance system having:
        a query processing module; and
        an outage avoidance processing module.

7. The DNS server system of claim 1, wherein the DNS server system is a recursive DNS server system.

8. The DNS server system of claim 1, wherein the remote DNS server system comprises one or more authoritative DNS servers.

* * * * *